United States Patent
Raghavan

(10) Patent No.: US 8,726,233 B1
(45) Date of Patent: May 13, 2014

(54) SYSTEM AND METHOD OF USING AN ACTIVE LINK IN A STATE PROGRAMMING ENVIRONMENT TO LOCATE AN ELEMENT

(75) Inventor: Vijay Raghavan, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 306 days.

(21) Appl. No.: 13/078,713

(22) Filed: Apr. 1, 2011

Related U.S. Application Data

(63) Continuation-in-part of application No. 13/021,943, filed on Feb. 7, 2011, which is a continuation of application No. 11/157,382, filed on Jun. 20, 2005, now Pat. No. 7,900,191.

(51) Int. Cl.
    *G06F 9/44* (2006.01)
(52) U.S. Cl.
    USPC ............ 717/113; 717/105; 717/106; 717/109; 717/110; 717/111
(58) Field of Classification Search
    None
    See application file for complete search history.

(56) References Cited

U.S. PATENT DOCUMENTS

| | | |
|---|---|---|
| 6,510,468 B1 | 1/2003 | Hayne |
| 6,976,243 B2 | 12/2005 | Charisius et al. |
| 7,337,102 B2 | 2/2008 | Mosterman |
| 7,801,715 B2 | 9/2010 | Ciolfi et al. |
| 7,809,545 B2 | 10/2010 | Ciolfi et al. |
| 7,900,191 B1 | 3/2011 | Raghavan |
| 8,126,691 B2 | 2/2012 | Ciolfi et al. |
| 2001/0030651 A1 | 10/2001 | Doyle |
| 2002/0152236 A1 | 10/2002 | Incertis-Carro |
| 2003/0182196 A1 | 9/2003 | Huang |
| 2004/0125121 A1 | 7/2004 | Pea et al. |
| 2004/0221238 A1 | 11/2004 | Cifra et al. |
| 2006/0010428 A1 | 1/2006 | Rushby et al. |
| 2006/0129976 A1 * | 6/2006 | Brand et al. ................... 717/109 |
| 2007/0157162 A1 * | 7/2007 | Ciolfi ............................ 717/105 |
| 2008/0092111 A1 * | 4/2008 | Kinnucan et al. ............. 717/105 |
| 2008/0098349 A1 | 4/2008 | Lin et al. |
| 2010/0037178 A1 * | 2/2010 | Queric ........................... 715/836 |
| 2010/0131857 A1 * | 5/2010 | Prigge ........................... 715/744 |
| 2012/0226967 A1 * | 9/2012 | Oh ................................ 715/205 |

OTHER PUBLICATIONS

The MathWorks, Stateflow® and Stateflow® Coder™ 7 User's Guide (copyright 1997-2009).*
The MathWorks, Learning Simulink® 6, copyright 1999-2005.*
The MathWorks, Stateflow® 7 Design and simulate state machines and control logic, copyright 2007.*
The MathWorks, "Stateflow and Stateflow Coder, For Complex Logic and State Diagram Modeling," User's Guide, Version 5.1, 896 pages, (2003).
Co-pending U.S. Appl. No. 13/021,943, entitled "System and Method of Using an Active Link in a State Programming Environment to locate an Element in a Graphical Programming Environment" by Raghavan, filed Feb. 7, 2011, 26 pages.

* cited by examiner

*Primary Examiner* — Insun Kang
(74) *Attorney, Agent, or Firm* — Harrity & Harrity, LLP

(57) ABSTRACT

A method is provided for interacting with the graphical model is provided. At least one of the plurality of views of the graphical model is parsed to create an intermediate representation. An interactive overlay is displayed using the display device. User interacts with the destination object based on an input instruction via the interactive overlay and modifies the destination object using the input instruction, the modifying allows the destination object to perform a modified operation when the model is executed. The graphical model includes execution semantics and a destination object, where the destination object is influenced by the execution semantics. The graphical model is rendered on a display device based on a selected view.

27 Claims, 13 Drawing Sheets

SYSTEM AND METHOD OF USING AN ACTIVE LINK IN A STATE PROGRAMMING ENVIRONMENT TO LOCATE AN ELEMENT

RELATED APPLICATION

This application is a continuation-in-part application of U.S. application Ser. No. 13/021,943, filed Feb. 7, 2011, which is a continuation application of U.S. application Ser. No. 11/157,382, filed Jun. 20, 2005 now U.S. Pat. No. 7,900,191). The content of the aforementioned applications are hereby incorporated by reference.

FIELD OF THE INVENTION

The present invention relates to graphical programming or modeling environments, in particular to methods, systems and computer program products for using an active link in a state programming environment to locate an element in a graphical programming or modeling environment.

REFERENCE TO COMPUTER PROGRAM LISTING APPENDIX

Two identical compact disks created on Jun. 18, 2005 having a total of 36.0 Kbytes were submitted with U.S. application Ser. No. 11/157,382 filed Jun. 20, 2005. Included on each compact disk are the files code_for_mapping.m, symbol_resolution.cpp, and parser.yac, the entire contents of which are incorporated by reference herein.

BACKGROUND OF THE INVENTION

Simulink® from The MathWorks, Inc. of Natick, Mass., provides tools for modeling and simulating a variety of dynamic systems in one integrated, graphical environment. Simulink® enables users to design a block diagram for a target system, simulate the behavior of the system, analyze the performance of the system, and refine the design of the system. A block defines a dynamic system within a block diagram. The relationships between each elementary dynamic system in a block diagram are illustrated by the use of signals connecting the blocks. Collectively the blocks and lines in a block diagram describe an overall dynamic system.

Simulink® allows users to design target systems through a user interface that allows drafting of block diagrams of the target systems. All of the blocks in a block library provided by Simulink® and other programs are available to users when the users are building the block diagram of the target systems. Individual users may be able to customize this set of available blocks to: (a) reorganize blocks in some custom format; (b) delete blocks they do not use; and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems.

FIG. 1 shows an example of a Simulink® model. The Simulink® model contains blocks and arrows that connect the blocks. Each arrow connecting one block to another block represents a signal having a value. In the model shown in FIG. 1, input Signal 100 generates an input signal and sends the signal to a Sum block 102 via link 110. Link 114 communicates the value of the continuous-time state of the Integrator block 104 as a signal from the Integrator block 104 to a Scope block 108 for display, and also sends the signal to a Gain block 106 through link 116. Gain block 106 performs calculation on the input signal from link 116 and outputs the result through link 116 to the Sum block 102. The Sum block 102 adds the signal from link 110 and the signal from link 118 and outputs the result through link 112 to the Integrator block 104. The Integrator block 104 takes the signal from link 112 and performs integration on the value forwarded by the signal to produce an updated output on link 114 at a new point in time. The model continues on indefinitely or until a predetermined condition is achieved, a time period is attained, the user interrupts the execution, or any other termination condition is met.

Stateflow® from The MathWorks, Inc. of Natick, Mass., provides a state-based and flow diagram environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

An example of a state diagram model created using Stateflow® is shown in FIG. 2A. Each arrow in the Stateflow® models represents a transition, which is a graphical object that, in most cases, links one object to another. One end of a transition is attached to a source object and the other end to a destination object. The source is where the transition begins and the destination is where the transition ends. A transition label describes the circumstances under which the system moves from one state to another. It is always the occurrence of some event that causes a transition to take place. The exemplar Stateflow® diagram as shown in FIG. 2A is embedded in a Simulink® environment. The Simulink® signals are provided to Stateflow®, and Stateflow® uses this information to decide whether there are changes in states.

Within the Stateflow® diagram of FIG. 2A, there are two states: an on state 120 and an off state 122. The default transition 126 determines the initial state is the off state 122. When an on_switch transition 130 is enabled, the enable signal passes to junction 124 and determines whether the temp 158 data is greater or equal to 30, if not, then the enable signal is passed on to signal link 132 and further finish the transition to the on state 120. Now the on state 120 is active and off state 122 inactive. The off state 122 will become active again when the off_switch signal 128 is enabled, at which time the on state 120 will become inactive.

When a user is viewing a state diagram, it is often difficult to determine function-call connectivity and components of the related Simulink® subsystem. For example, when editing a state diagram it can be difficult to determine which element of the block diagram environment the Stateflow® state variable is related to. To illustrate further, FIG. 2B shows a Stateflow® diagram and FIG. 2C depicts a related Simulink® model. When a user is editing the Stateflow® diagram of FIG. 2B, the user may not know or may have forgotten that the call 260 to CALC_TH is related to the Threshold_Calculation 270 subsystem of FIG. 2C. The difficulty in determining this function-call connectivity can result in decreases in modeling efficiency.

Therefore, a need exists for a system, method, and computer implemented product that uses an active link in a state programming environment to locate an element in a graphical programming environment.

SUMMARY OF THE INVENTION

The present invention provides programming or modeling environments in which an active link in a state programming environment is used to locate an element in a programming environment. As used herein, the terms "program/programming" and "model/modeling" will be used interchangeably in the description of the present invention.

In one aspect, one or more non-transitory computer-readable media holding executable instructions that when executed on a processor interact with a graphical model are provided. The media holds one or more instructions for interacting with the graphical model, parsing at least one of the plurality of views to create an intermediate representation, displaying an interactive overlay using the display device, interacting with the destination object based on an input instruction via the interactive overlay and modifying the destination object using the input instruction, the modifying allowing the destination object to perform a modified operation when the model is executed. The graphical model includes a plurality of view and a selected view, where the selected view is one of the plurality of views. The graphical model also includes execution semantics and a destination object, where the destination object is influenced by the execution semantics. The graphical model is rendered on a display device based on the selected view. The intermediate representation includes information about the destination object. Displaying the interactive overlay maintains the selected view with respect to the destination objects.

In another aspect, the media hold one or more instructions for interacting with the graphical model, displaying an interactive overlay using the display device and monitoring an operation associated with the destination object while the graphical model executes. The graphical model includes a plurality of model views. The plurality of model views includes a selected view and the graphical model is rendered on a display device via the selected view. The interactive overlay is displayed in the selected view. The graphical model also includes destination object.

In yet another aspect, the media hold one or more instructions for interacting with a graphical model, displaying the first element in the first view using a display device, displaying an overlay and performing an operation related to the second element using the overlay. The graphical model includes a plurality of views including a first view and a second view. The graphical model further includes a first element in the first view and a second element in the second view. The first element in the first view is related to the second element in the second view. The second element is associated with second element information. The overlay includes at least a portion of the second view that includes the second element, at least a portion of the second element information, or a modification affordance related to the second element.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
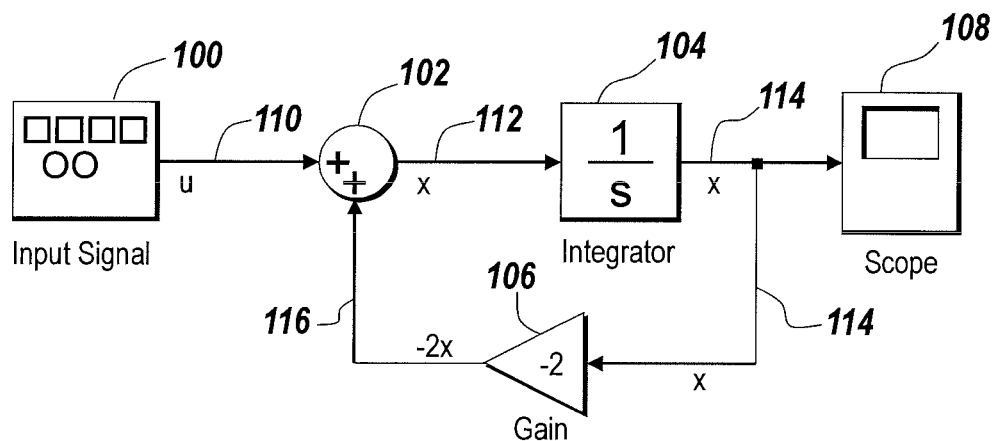
FIG. 1 shows an exemplary Simulink® model.
Figure 2A:
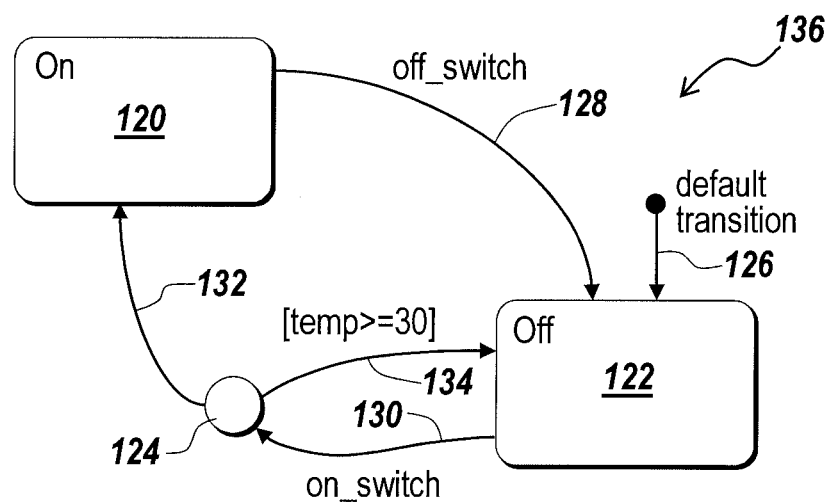
FIG. 2A shows an exemplary Stateflow® diagram.
Figure 2B:
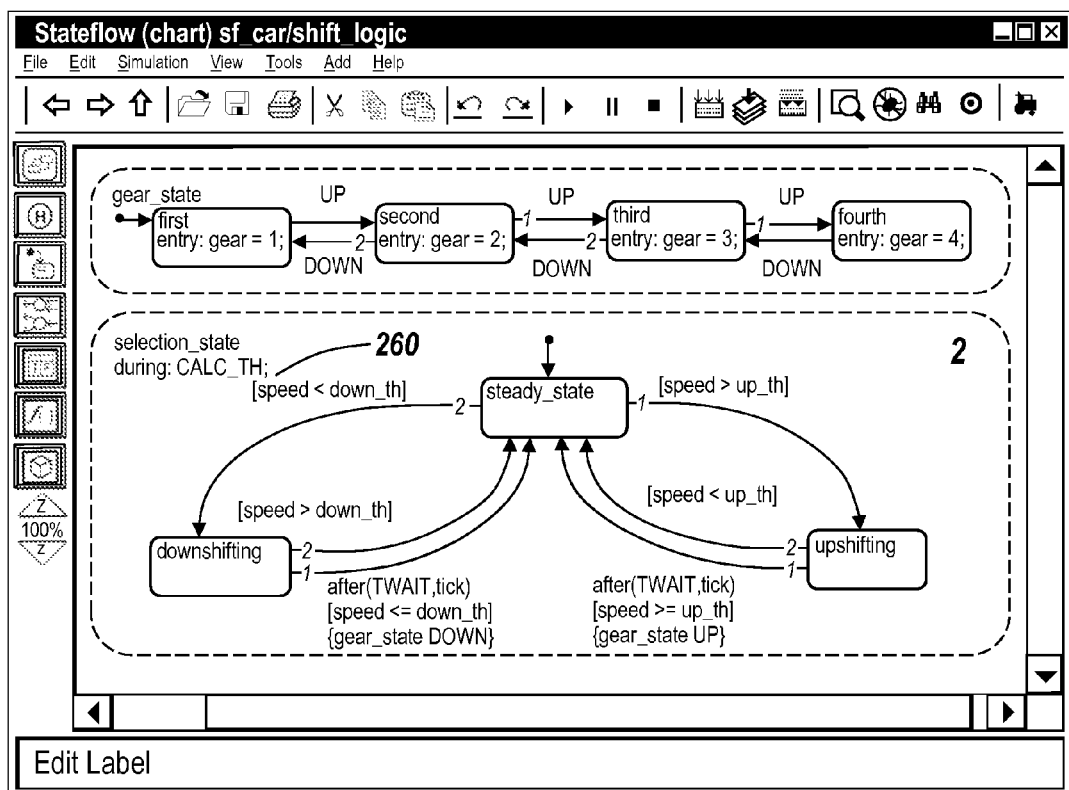
FIG. 2B shows another exemplary Stateflow® diagram.
Figure 2C:
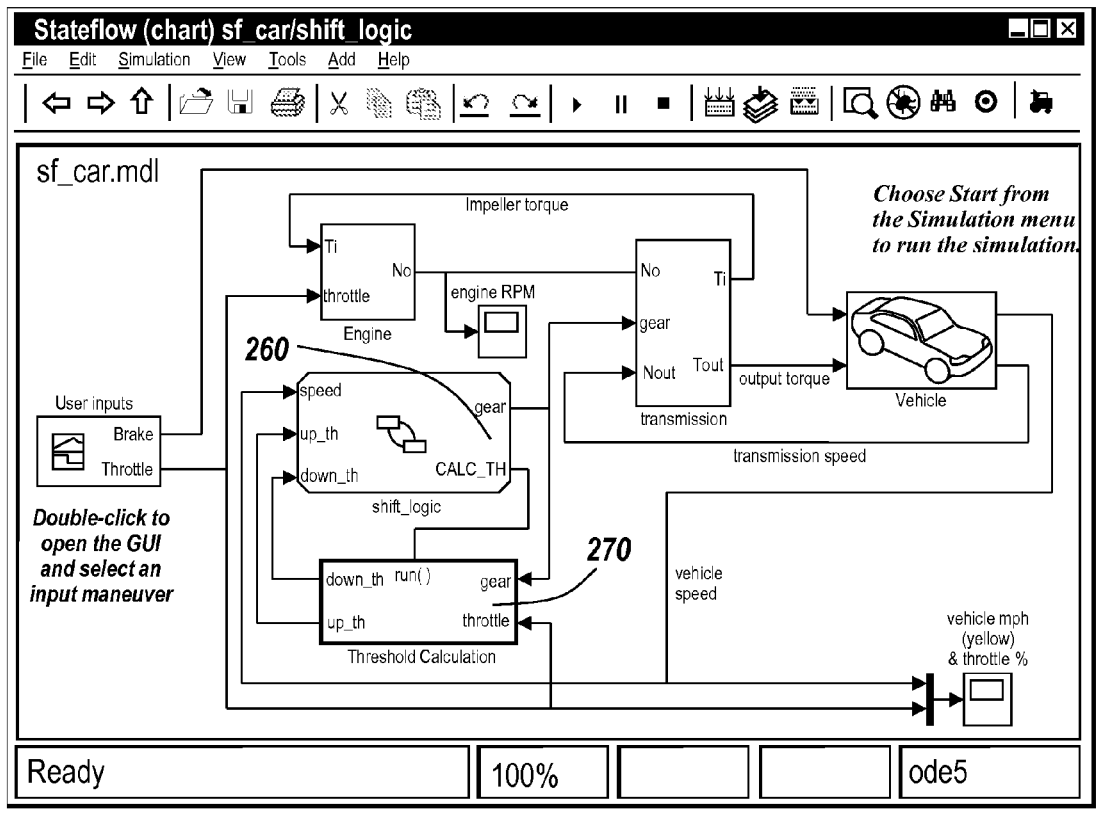
FIG. 2C shows another exemplary Simulink® model.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Certain embodiments of the present invention are described below. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical programming or modeling environment in which a graphical program or model is simulated/executed, analyses such as sensitivity and trim computations are performed, or code is generated for the model. The terms "program/programming" and "model/modeling" will be interchangeably used in the description of the illustrative embodiment. In the description of the illustrative embodiment, the simulation of the graphical program/model is also referred to as the execution of the program/model.

The described embodiment will be described below solely for illustrative purposes relative to a time-based block diagram environment and/or a state-based and flow diagram environment. Although the illustrative embodiment will be described relative to the time-based block diagram environment and/or the state-based and flow diagram environment, one of skill in the art will appreciate that the present invention may apply to other graphical programming/modeling environments, including data flow diagram environments and Unified Modeling Language (UML) environments, and other non-graphical programming/modeling environments.

The illustrative embodiment will be described below relative to a Simulink® model and a Stateflow® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

Exemplary embodiments can include a model containing an active link that may be used to locate an element in a graphical programming environment. The model may take many forms, including but not limited to those of a graphical model such as a state diagram, statechart or block diagram. The model may have a plurality of views, and each view may illustrate one or more functionalities of the model. A same functionality may be illustrated in one or more views. The active link may manifest itself as a hyperlink or other linking mechanism. The active link may interconnect a first component of the model with a second component. The second component may be the element in the graphical programming environment. The element may be a destination object.

By way of example, the model may be a statechart in an embodiment. There may be a selected view associated with the statechart for displaying properties of the statechart that are associated with the selected view. The statechart can contain text that refers to an object, and a hyperlink may be associated with the text. When the text is selected, a snapshot of the object appears in an interactive overlay, such as a window. The interactive overlay may enable editing of the object. According to exemplary embodiments, the object may be provided in a view of the model other than the selected view. When the text is selected, the view of the model including the object may be shown in the interactive overlay. The view of the model that includes the object may have its own associated windows or widgets.

In some embodiments, the interactive overlay may enable modifying the destination object such as changing the graphical appearance of the destination object or changing the underlying semantics of the destination object. The interactive overlay may also be used to perform debugging of the destination object. The modifications to the destination object may be provided using a drop down menu. A selected modification may be applied to the destination object and displayed on the interactive overlay.

Figure 3:
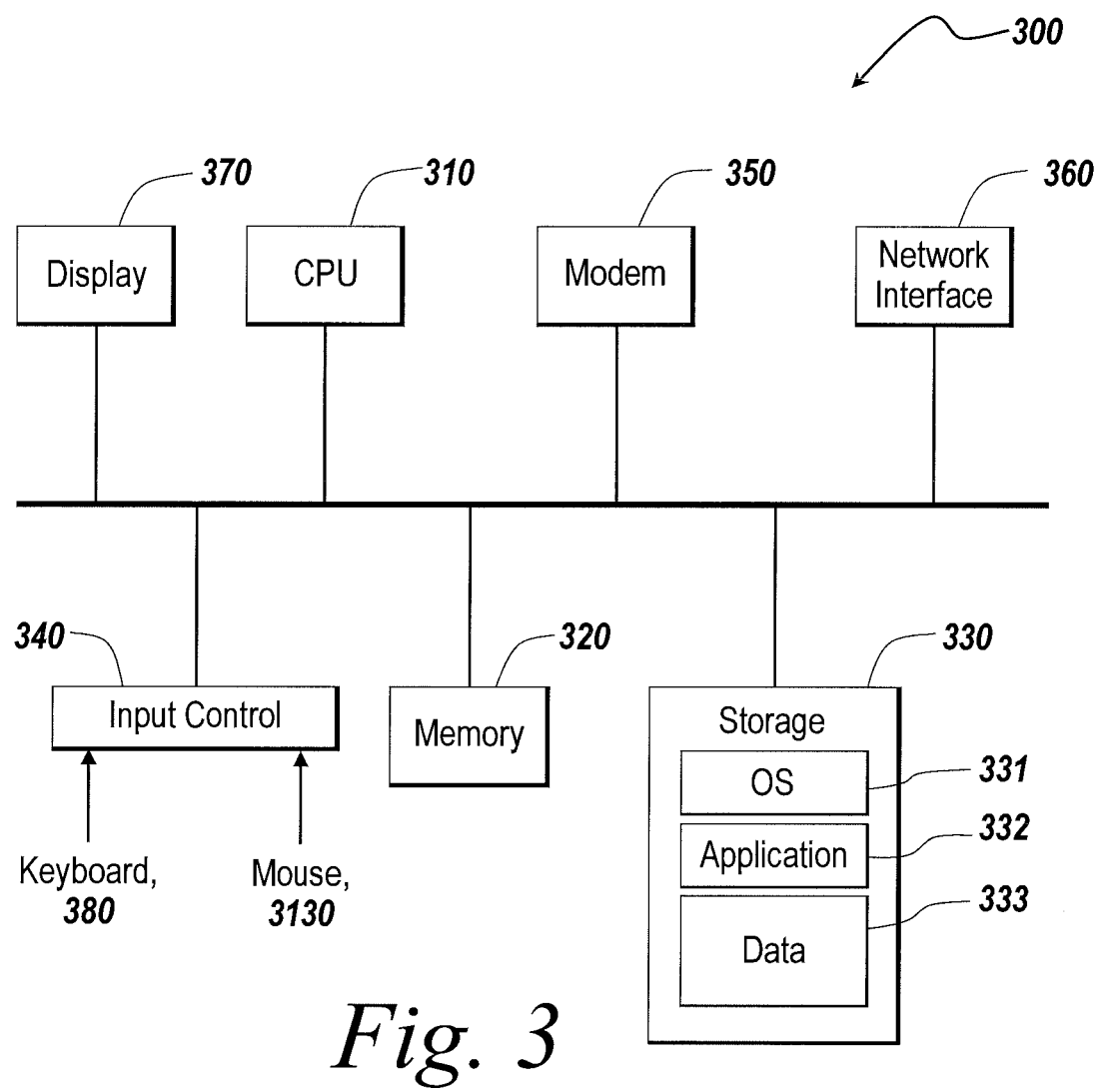
FIG. 3 shows an exemplary computing device suitable for practicing principles of the invention.

FIG. 3 is an exemplary computing device 300 suitable for practicing the illustrative embodiment of the present invention, which provides a block diagram environment. One of ordinary skill in the art will appreciate that the computing device 300 is intended to be illustrative and not limiting of the present invention. The computing device 300 may take many forms, including but not limited to a workstation, server, network computer, quantum computer, optical computer, bio computer, Internet appliance, mobile device, a pager, a tablet computer, and the like.

The computing device 300 may be electronic and include a Central Processing Unit (CPU) 310, memory 320, storage 330, an input control 340, a modem 350, a network interface 360, a display 370, etc. The CPU 310 controls each component of the computing device 300 to provide the block diagram environment. The memory 320 temporarily stores instructions and data and provides them to the CPU 310 so that the CPU 310 operates the computing device 300 and runs the block diagram environment. The storage 330 usually contains software tools for applications. The storage 330 includes, in particular, code 331 for the operating system (OS) of the device 300, code 332 for applications running on the operation system including applications for providing the block diagram environment, and data 333 for block diagrams created in the block diagram environment and for one or more coding standards applied to the block diagrams.

The input control 340 may interface with a keyboard 380, a mouse 390, and other input devices. The computing device 300 may receive through the input control 340 input data necessary for creating block diagrams, such as the selection of the attributes and operations of component blocks in the block diagrams. The computing device 300 may also receive input data for applying a coding standard to a block diagram, such as data for selecting the coding standard, data for customizing the coding standard, data for correcting the violation of the coding standard in the block diagram, etc. The computing device 300 may display in the display 370 user interfaces for the users to edit the block diagrams. The computing device 300 may also display other user interfaces, such as a user interface for selecting a coding standard, a user interface for customizing the coding standard, a user interface for displaying a corrected block diagram that removes the violation of the coding standard, etc.

Figure 4:
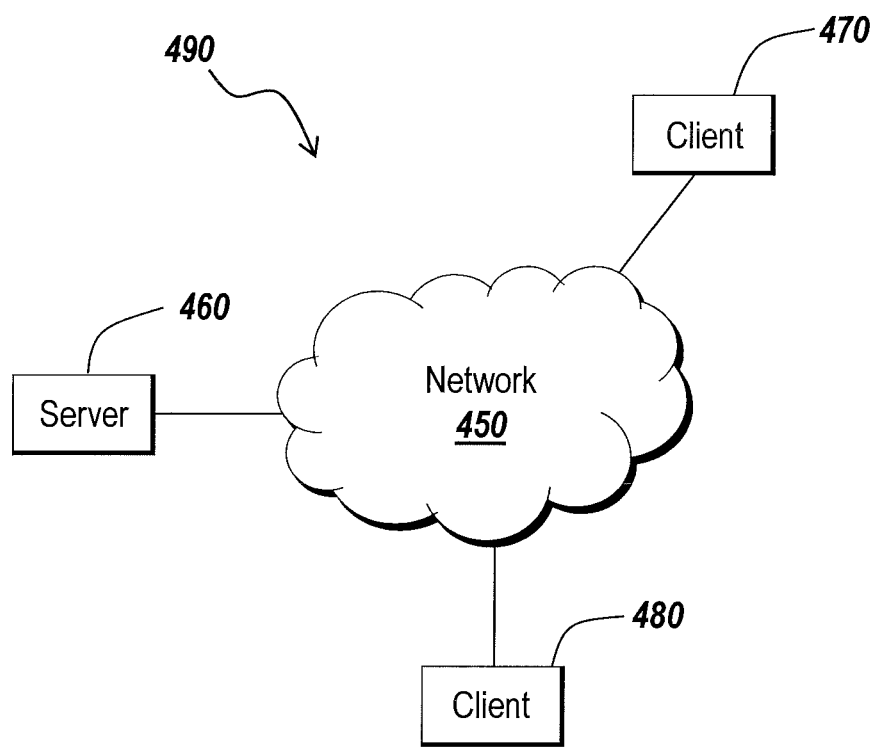
FIG. 4 shows an exemplary network environment suitable for practicing principles of the invention.

FIG. 4 is an exemplary network environment 490 suitable for the distributed implementation of the illustrative embodiment. The network environment 490 may include a server 460 coupled to clients 470 and 480 via a communication network 450. The server 460 and clients 470 and 480 can be implemented using the computing device 300 depicted in FIG. 3. The network interface 360 and the modem 350 of the computing device 300 enable the server 460 to communicate with the clients 470 and 480 through the communication network 450. The communication network 450 may include Internet, intranet, LAN (Local Area Network), WAN (Wide Area Network), MAN (Metropolitan Area Network), etc. The communication facilities can support the distributed implementations of the present invention. It should be understand that more than one server can be used in the distribution environment.

In the network environment 490, the server 460 may provide the clients 470 and 480 with software components or products under a particular condition, such as a license agreement. The software components or products may include those for providing a block diagram environment and those for creating a block diagram in the block diagram environment. The software components or products may also include those for providing one or more coding standards and those for applying the coding standard to the block diagram. The server 460 may send the clients 470 and 480 the software components or products under a specific license agreement.

Figure 5:
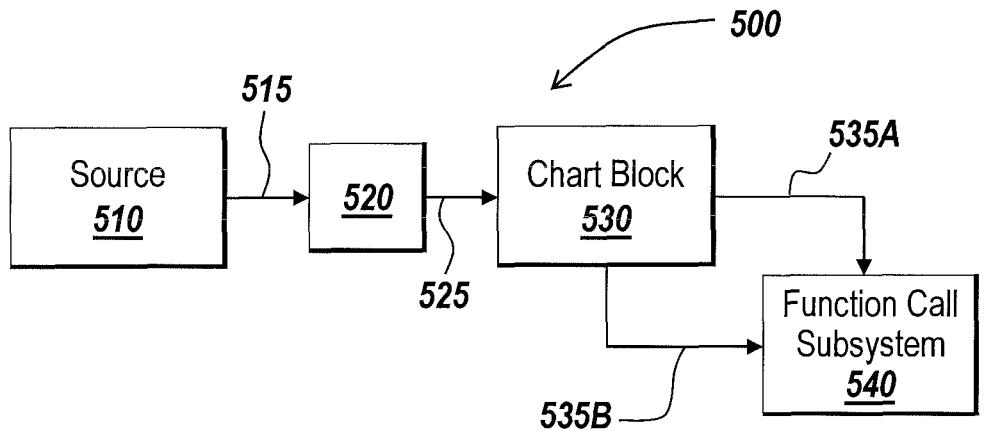
FIG. 5 shows an abstracted Simulink® model suitable for practicing principles of the invention.

FIG. 5 shows an abstracted Simulink® model in which principles of the present invention can be practiced. The model 500 includes a source block 510, a user-defined function block 520, a chart block 530, which can also be thought of as a state machine, and a function-call subsystem block 540. The source block 510 is coupled with the user-defined function block 520, which is coupled with the chart block 530. In this embodiment, a control output 535A and value output 535B are coupled with the function-call subsystem block 540.

The source block provides a source output 515 to the user-defined function block 520. In one embodiment, the user-defined function block 520 is an embedded MATLAB® function. As used herein, an embedded MATLAB® function refers to block that allows a user to compose a MATLAB® language function in a Simulink model to generate embeddable code. In an embedded MATLAB® function block, the user creates functions with a rich subset of the MATLAB® language. Later, when the user simulates the model or generates code for a target environment, a function that is included as part of the embedded MATLAB® function block generates C code. The user-defined function block 520 provides an output 525 that is used as an input to chart block 530.

The chart block 530 represents a Stateflow® diagram that the user builds using Stateflow® objects. The chart block 530 may be created by using menu commands present within the Simulink® programming model. The chart provides state machine functionality within the graphical programming environment. The chart block 530 provides a means to schedule execution of the function-call subsystem block 540. The control output 535A and the value output 535B are provided to the function-call subsystem block 540.

The function-call subsystem block 540 represents a subsystem that can be invoked as a function by another block of the model 500. As used herein, a function-call subsystem refers to a function whose execution is determined by logic internal to an S-function. As used herein, an S-function refers to a computer language description of a Simulink® block. The function-call subsystem block 540 executes in response to information or data provided from the chart block 530. Said another way, an action within the chart block 530 invokes the execution of the function subsystem block 540. This example illustrates what is also known as function-call connectivity.

Figure 6A:
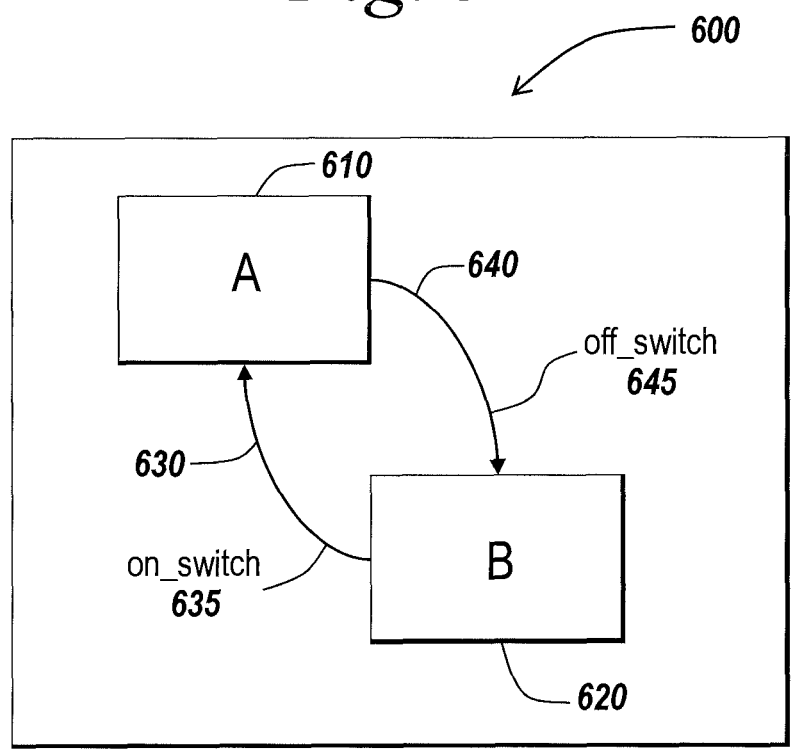
FIG. 6A shows an abstraction of a Stateflow® diagram suitable for practicing principles of the invention.

With reference to FIG. 6A, an abstracted Stateflow® diagram is shown. A state diagram 600 is created with a graphical editor (not shown) that is included as part of the graphical programming environment. The state diagram can include both graphical objects and non-graphical objects. Examples of graphical objects include state boxes, transitions, charts, history junctions, default transitions, connective junctions, truth table functions, graphical functions, embedded MATLAB® functions, boxes, and the like. Examples of non-graphical objects include, but are not limited to, event objects, data objects, and target objects.

An event is a Stateflow® object that can trigger a whole Stateflow® chart or individual actions in a chart. Because Stateflow® charts execute by reacting to events, the user specifies and programs events into charts to control their execution. The user can broadcast events to every object in the scope of the object sending the event, or the user can send an event to a specific object. The user can define explicit events that the user specifies directly, or the user can define implicit events to take place when certain actions are performed, such as entering a state.

A Stateflow® chart stores and retrieves data that it uses to control its execution. Stateflow® data resides in its own workspace, but the chart can also access data that resides externally in the Simulink® model or application that embeds the Stateflow® machine.

The user can build targets in Stateflow® to execute the application the user programs in Stateflow® charts and the Simulink® model that contains them. A target refers to a program that executes a Stateflow® model or a Simulink® model containing a Stateflow® machine. The user can build a simulation target (named sfun) to execute a simulation of the model. The user can build a Real-Time Workshop® target (named rtw) to execute the Simulink® model on a supported processor environment. The user can also build custom targets (with names other than sfun or rtw) to pinpoint the application to a specific environment.

The state diagram 600 includes a first state 610 and a second state 620 that are connected by transitions 630, 640. Each of the transitions 630, 640 includes a transition label 635, 645, respectively, that describes the circumstances under which a change from one state to another occurs. The transition labels 635, 645 can include any alphanumeric and special character combination or discrete actions. The transition labels 635, 645 can define data, events, function calls, and states. For example, transition label 645 can reference off_switch while transition label 635 can reference on_switch. As expected, these labels describe transitions between the on and off states for a switch.

Figure 6B:
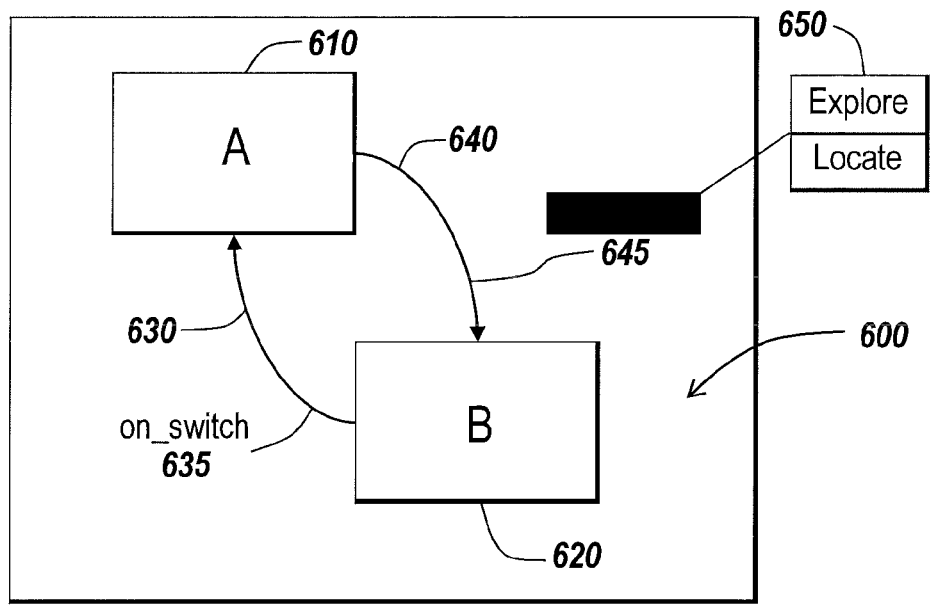
FIG. 6B shows another embodiment of an abstraction of a Stateflow® diagram suitable for practicing the invention.

In one embodiment, in order to locate the associated graphical element of the graphical programming environment the user selects the transition label 635. Selection can include, but is not limited to, clicking, highlighting, and hovering over the transition label 635. In one embodiment, the transition label 635 is represented as a hyperlink. The properties, such as color, size, and text formatting, can be user controller or predefined. In another embodiment, the transition label 635 is presented as a hot spot. In such an embodiment, when positioning the cursor over the hot spot a context menu 650, as shown in FIG. 6B, is shown to the user that allows the user to select a "locate" function. In yet another embodiment, the label appears as just regular text and upon highlighting the label or any portion thereof and right clicking, the context menu 650 is display to the user that includes an option to "locate" the related function.

In response to selecting a transition label, the corresponding graphical element of the graphical programming environment is located within the graphical model and displayed to the user. In some additional embodiments, when the element includes configurable parameters, the element is opened for editing by the user. Generally, this operation can be described as selecting text in a Stateflow® diagram and, as a result, opening the related Simulink® subsystem. It should also be noted that this concept can be applied for use with embedded MATLAB® scripts. For example, a user can select a variable from within the embedded MATLAB® script, right-click on the selected variable, and select the "locate" function from a context menu.

Figure 7:
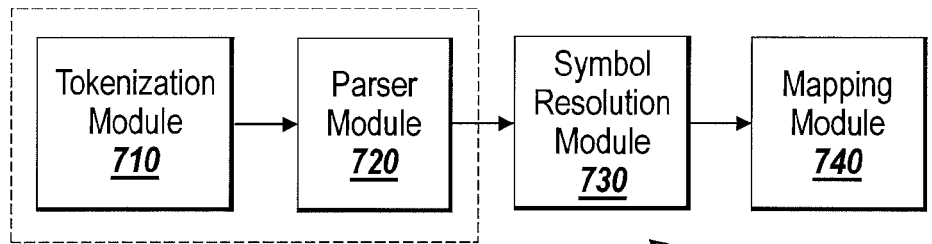
FIG. 7 shows a block diagram of software modules suitable for practicing principles of the invention.

With reference to FIG. 7, a conceptual block diagram is described that provides a system 700 to resolve the location of the graphical element of the graphical programming environment that is associated with the text of the state diagram. In one embodiment, the system 700 includes a tokenization module 710, a parsing module 720, a symbol resolution module 730, and a mapping module 740. Although each module is listed specifically, it should be understood that the functionality of each module can be implemented as a single or multiple programming modules.

Figure 8:
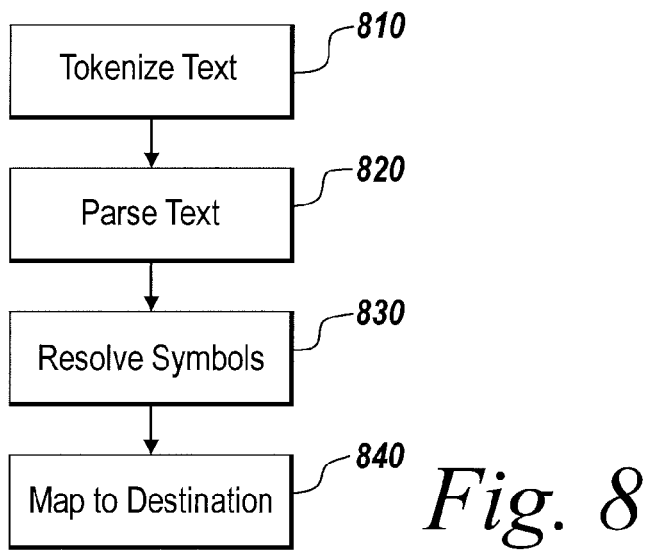
FIG. 8 shows a flow chart of an embodiment of a method of locating an element of a graphical programming environment according to principles of the invention.

In operation and with reference to FIG. 8, the tokenization module 710 and parsing module tokenize (step 810) and parse (step 820) the selected text to generate symbols. In one embodiment, the parser module 710 and the tokenization module 720 can be implemented as a single module known as FPARSER that is distributed as part of the Simulink® program. Operationally, FPARSER parses an M-file or command line and list tokens and constructs functions/keywords, variables/constants, and struct field assignments. It should be understood that other parsing and tokenization modules can be used. In one embodiment, the set of grammar rules by the tokenization and parsing module is the parser.yac file, which can be found on the included compact disk.

After parsing the text of the transition label, the symbol resolution module 730 performs (step 830) a hierarchical resolution of the symbols to generate location identifiers. Examples of location identifiers can include, but are not limited to, data handles, function handles, event handles, and the like. In one embodiment, the computer code of the file symbol_resolution.cpp, which can be found on the included compact disk, is used to perform symbol resolution: The parsed and tokenized label maybe resolved to a handle that directly identifies the related function-call subsystem of the Simulink® model.

The mapping module 740 uses the location identifiers to perform event-to-port mapping (step 840), which determines which port of the chart block is associated with the location identifier. The connector from the identified port is followed to its destination to reveal the associated subsystem. Once identified, in one embodiment the graphical programming environment is positioned such that it is displayed to the user and opened for editing by the user. In order to position the graphical programming environment, a depth first graphical search that is robust to cycles is employed by the mapping module 740. The mapping function is capable of following "goto" and "from" blocks. Also, the mapping function can "drill down" on subsystem ports. For example, a subsystem can have another subsystem within itself. In one embodiment, the computer code of the file code_for_mapping.m, which can be found on the included compact disk, is used to perform the mapping functionality.

Figure 9A:
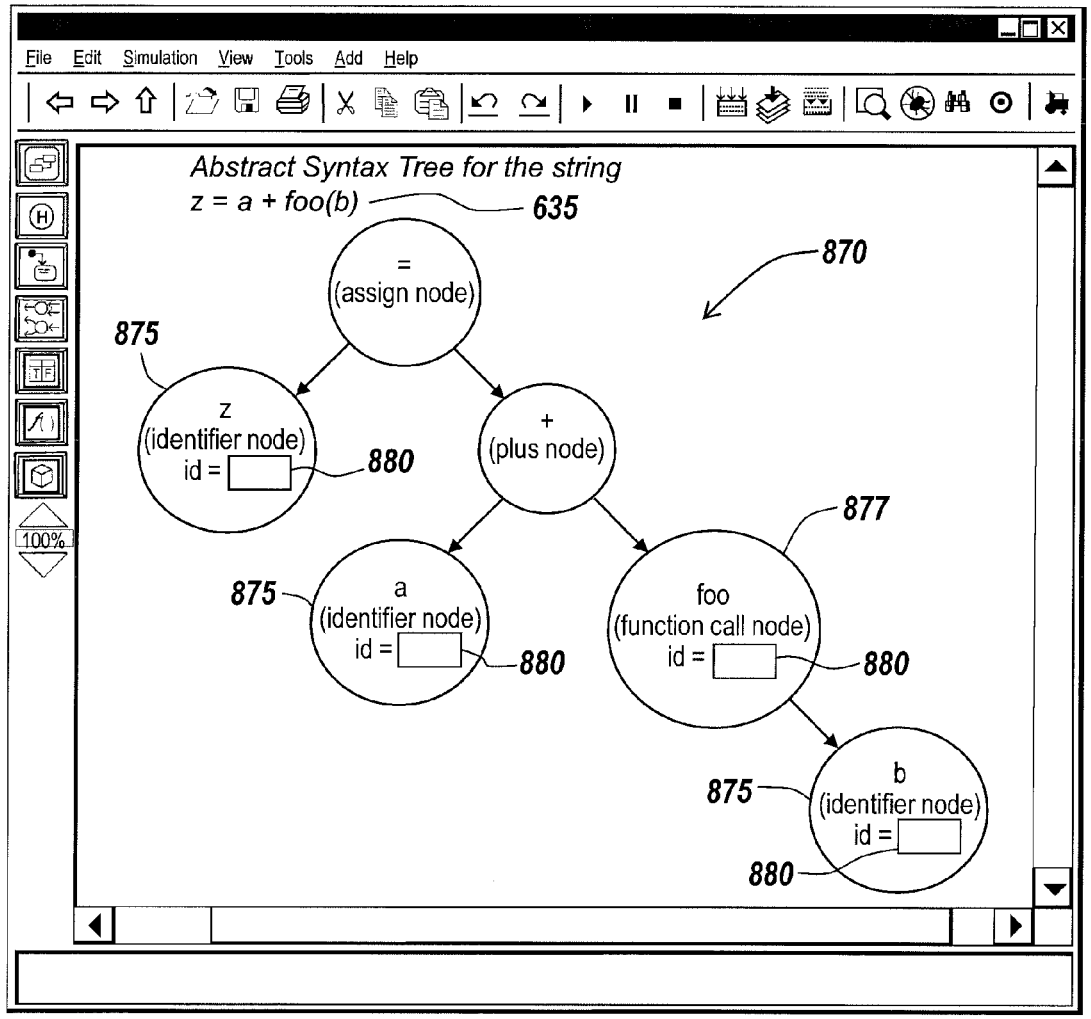
FIGS. 9A and 9B show embodiments of an abstract syntax tree suitable for practicing principles of the invention.
Figure 9B:
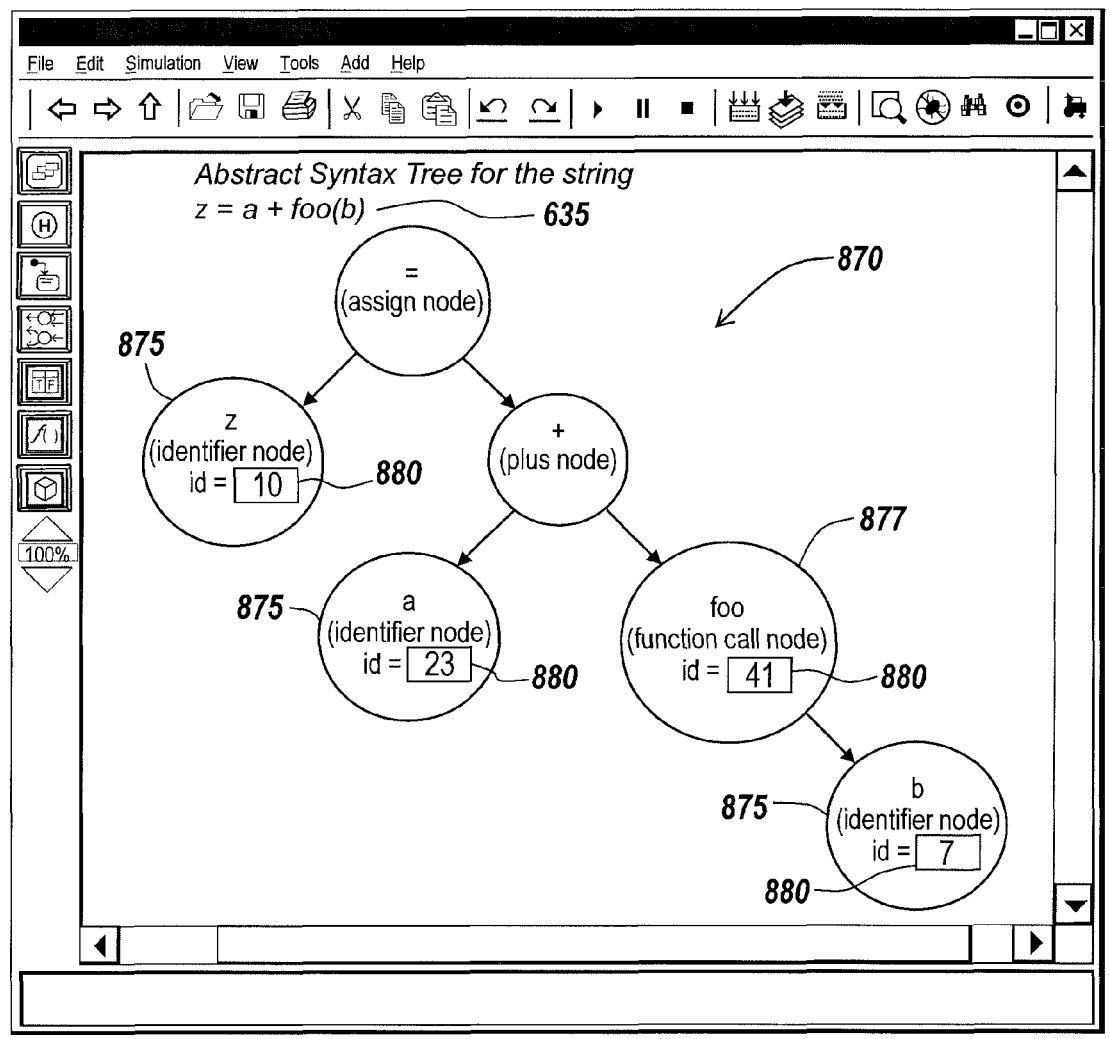

FIGS. 9A and 9B depict a screen sheet of an exemplary abstract syntax tree 870 that can be used in the resolution of a transition label 635 according to principles of the invention. In this example, the transition label 635 is "z=a+foo(b)." The tokenization module 710 and parsing module 720 receive the transition label 635 as a data string. The tokenization module 710 tokenizes the transitions label 635 into the following tokens: {"z", "=", "a", "+", "foo","(","b",")"}. The parsing module 720 uses Backus-Naur (BNF) grammar and generates the abstract syntax tree 870. Backus-Naur notation (more commonly known as BNF or Backus-Naur Form) is a specification that describes the syntax of the programming languages.

The initial abstract syntax tree 870, as shown in FIG. 9A, contains identifier nodes 875 and function-call nodes 877, which have not been resolved to their corresponding objects in Stateflow®. An "ID" field 880 is empty for each of the nodes. In order to generate the contents of the ID fields 880, the symbol resolution module 730 uses a hierarchical name matching scheme. For example, the file symbol_resolution-.cpp on the included compact disk can be used to perform the symbol resolution. At the completion of symbol resolution scheme, the ID field 880 of each identifier node and function-call node in the abstract syntax tree 870 is populated by the "handle" of the Stateflow® object that represents this symbol.

In one embodiment, the Stateflow® object handle is an integer number that is used, instead of a pointer, to identify the object. Stateflow® maintains a mapping table (not shown) between the integer handle and the object pointer thus making them equivalent. Continuing with the above example, assume that the handles for the identifiers "z", "a", "foo" and "b" are 10, 23, 41, and 7, respectively. The mapping module 740 traverses the abstract syntax tree 870, computes a list of resolved symbols and their associated handles, and populates the ID fields 880 of the nodes, as shown in FIG. 9B. In this example, the result is a list of ordered pairs having a string portion and a handle portion as follows: {("z",10) ("a",23) ("foo",41) ("c",7)}. In one embodiment, the string portions of these ordered pairs are presented to the user in the context menu 650 as options for hyperlinking. When the user selects one of the strings, the corresponding integer handle is used to perform the above-described hyperlinking or hot-looking.

As described, the relationship between the text of the Stateflow® diagram and the Simulink® programming element represents an actively managed mapping between those elements. The relationship can also be thought of as a dynamic link creation between those elements. The relationship is dynamic in nature because the link/relationship is created with reference to the current state of the Stateflow® and Simulink® models. As these models change, the links/relationships change accordingly.

Figure 10A:
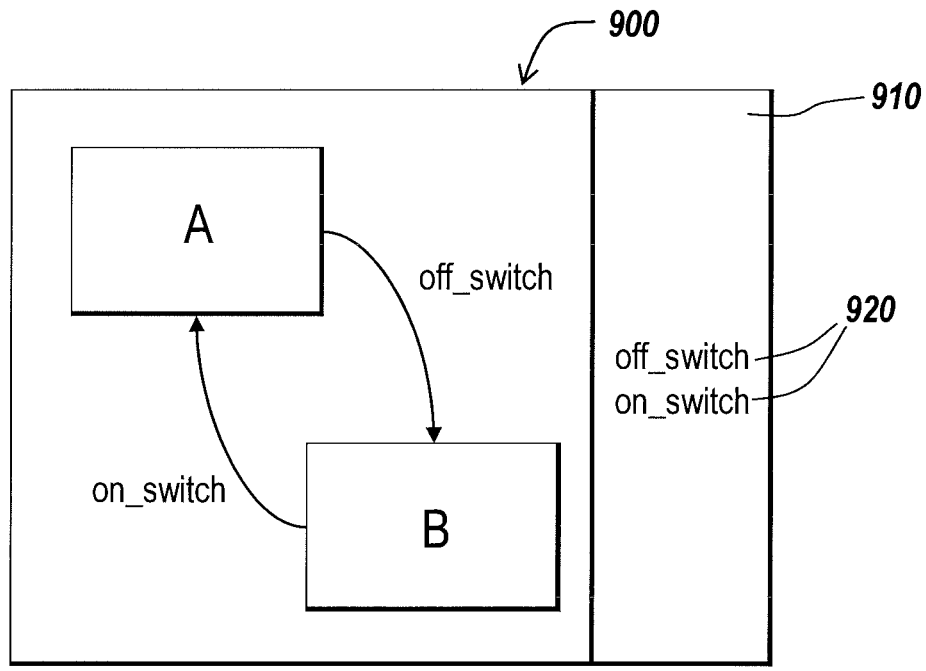
FIGS. 10A and 10B show embodiments of a Stateflow® diagram constructed according to principles of the invention.
Figure 10B:
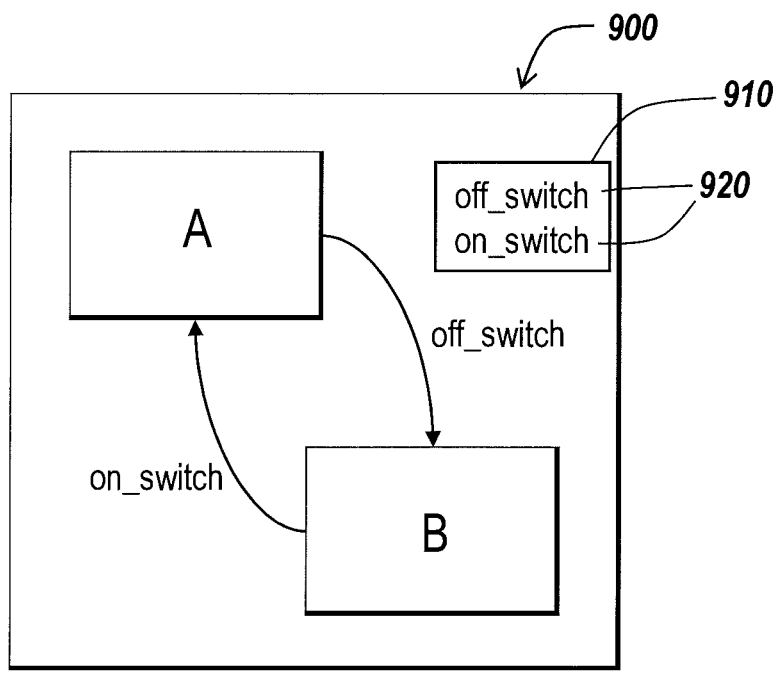

With reference to FIGS. 10A and 10B, other embodiments of an abstracted Stateflow® diagram are described. A state diagram 900 is created with a graphical editor (not shown) that is included as part of the graphical programming environment. The state diagram can include both graphical objects and non-graphical objects. The state diagram 900 includes a window portion 910 that displays the parsed and tokenized text 920 of the transitional labels used within the state diagram 900. In such an embodiment, the user can select the parsed and tokenized elements 920 from within the window 910 and have the associated graphical element with which the transition label is associated displayed to the user. In one embodiment, the window portion 910 is displayed as part of the graphical state editor. In another embodiment and with reference to FIG. 9B, the window portion 910 is positionable by the user.

The parsed and tokenized elements 920 can be displayed as hyperlinks. Clicking on the hyperlink invokes the symbol resolution and mapping features of the invention to locate and display the related element of the graphical programming environment. In another embodiment, the parsed and tokenized elements 920 are displayed as hot spots. Upon hovering or clicking the hot spot, the symbol resolution and mapping features of the inventions are invoked to display the related element of the graphical programming environment.

Exemplary embodiments can be configured to have a programming environment that includes a model having a textual element referencing a destination object. The model can be a flat model or a hierarchical model. The model may have a plurality of views and can be displayed using a selected view. The destination object may be in a view of the model that differs from the selected view. There may be an active link between the textual element and the destination object. The active link provides an efficient way to retrieve and/or navigate to the destination object. Selecting and/or activating the textual element enables navigating to the destination object via the active link.

The active link may also enable modifying the destination object either directly or indirectly by modifying the symbol. The modifications to the symbol may be automatically applied to the destination object through the active link.

Figure 11A:
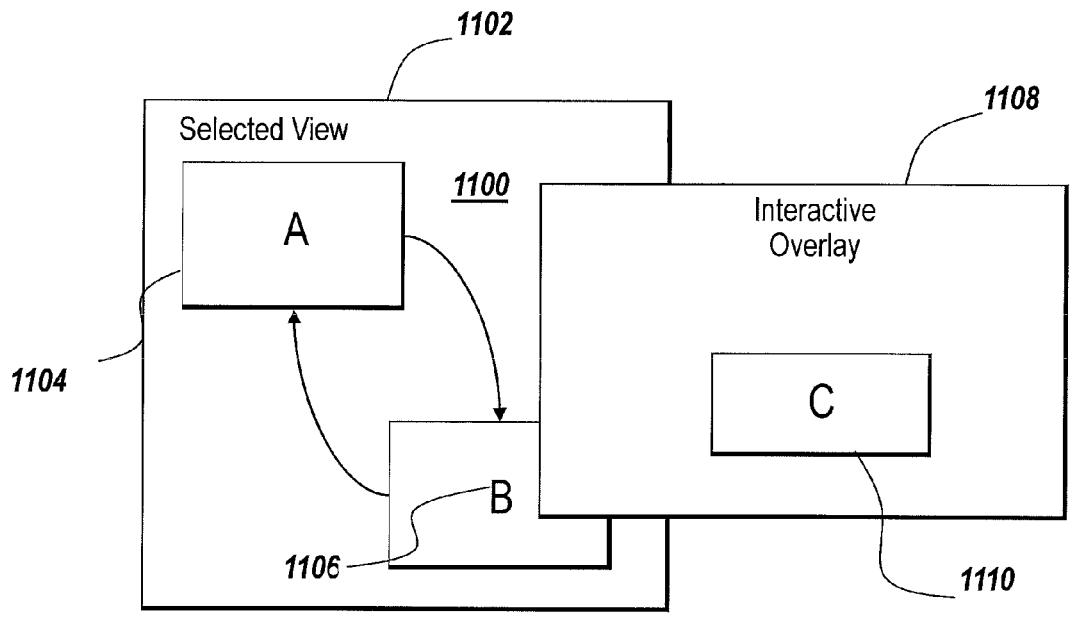
FIG. 11A illustrates an interactive overlay displaying a destination object upon selecting a source object, according to various embodiments.

FIG. 11A illustrates an exemplary model 1100 that includes graphical element 1104 and textual element 1106 for representing various functionalities of model 1100. Model 1100 may have a plurality of views, and each view may illustrate one or more functionalities of model 1100. A same functionality may be illustrated in one or more views. The views may also represent different modes of model 1100, such as an editing mode where the user may edit model 1100 or a debugging mode where model 1100 is checked for errors. Model 1100 may be displayed according to a selected view 1102. Selected view 1102 may be displayed on a display device by rendering model 1100 in accordance with the selected view 1102.

Textual element 1106 may include a reference to a destination object 1110. Textual element 1106 may be, for example, a symbol, a label, or a string of characters. For example, where model 1100 is a Stateflow® diagram shown in a selected view 1102, the textual element 1106 may be a reference to a function or a subsystem referenced using the action language of Stateflow®. Textual element 1106 may be illustrated with a visual cue, such as color, shading, underlining, etc.

Selecting or activating textual element 1106 may cause the display of a snapshot of destination object 1110. According to various embodiments, textual element 1106 may be selected and/or activated by, for example, positioning a cursor to point at textual element 1106 and selecting textual element 1106 using a pointing device, such as a computer mouse or trackball. Textual element 1106 may be associated with a hyperlink to destination object 1110. Thus, selecting textual element 1106 may activate the hyperlink and cause a view of destination object 1110 to be retrieved and displayed.

Destination object 1110 may be a textual object, a graphical object or a combination of a textual object and a graphical object. In some embodiments, destination object 1110 may be a graphical subsystem referenced by textual element 1106. Textual element 1106 may be the name of the subsystem provided as destination object 1110.

Destination object 1110 may be an executable object associated with executable code of model 1100. A portion of the executable code of model 1100 may be associated with destination object 1110. Execution of the executable code associated with destination object 1110 may cause the destination object 1110 to perform operations. For example, destination object 1110 may generate an output signal or an output value when destination object 1110 is executed. According to another example, destination object 1110 may generate a plot when destination object 1110 is executed.

Exemplary embodiments may allow destination object 1110 to be displayed on a display device, for example display 370 in response to selecting textual element 1106. For example, as illustrated in FIG. 11A, destination object 1110 may be displayed as an overlay 1108 on selected view 1102 of model 1100 in response to selecting or hovering over textual element 1106. Overlay 1108 may be transparent or semi-transparent. Overlay 1108 may show an interactive view where the user may interact with and/or modify the graphical representation and the underlying semantics of destination object 1110. When destination object 1110 is being modified, overlay 1108 may be closed.

In some embodiments, destination object 1110 may not be a part of selected view 1102 of model 1100. Destination object 1110 may be a part of one or more views, other than the selected view, associated with model 1100.

Figure 11B:
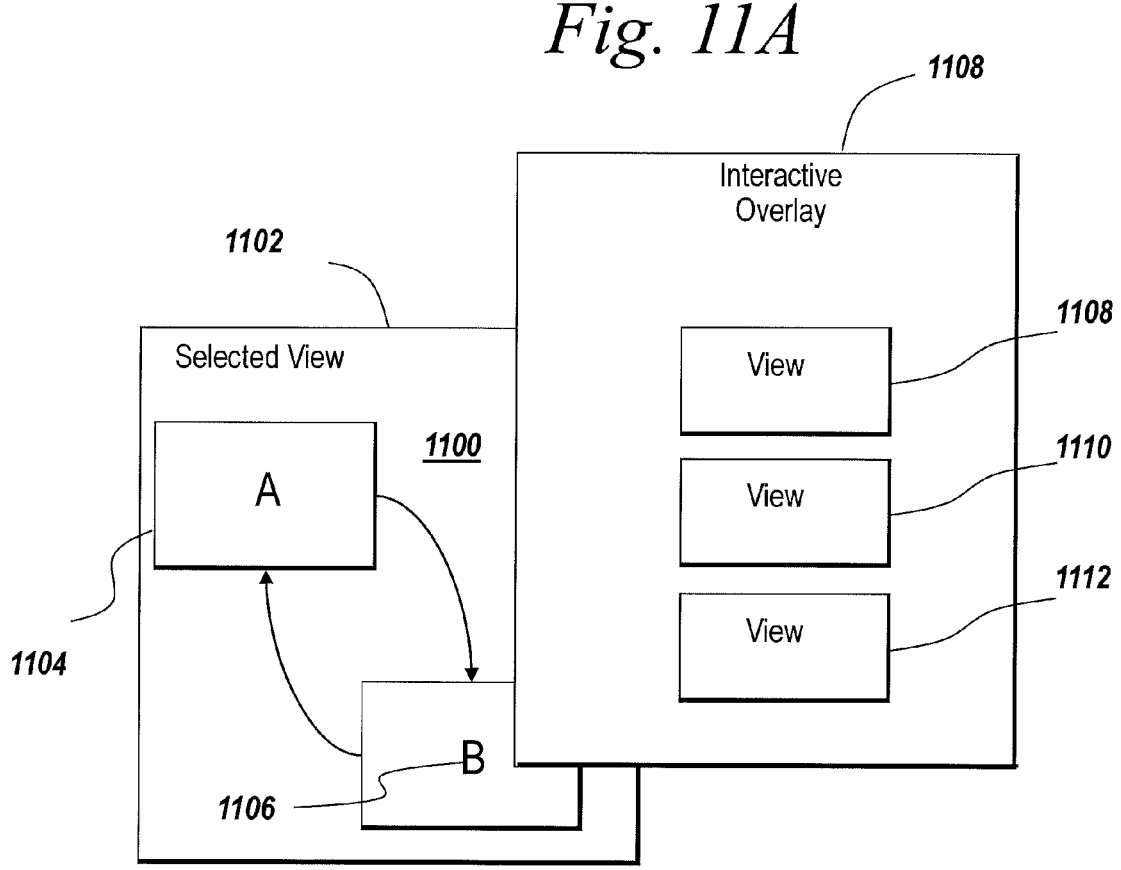
FIG. 11B illustrates an interactive overlay displaying a plurality of views associated with a model upon selecting a source object in the model, according to various embodiments.

FIG. 11B illustrates an interactive overlay 1108 that includes a plurality of views associated with model 1100 that may include destination object 1110. As illustrated in FIG. 11B, interactive overlay 1108 may display views 1112, 1114, 1116 over a portion of the selected view 1102. Views 1112, 1114, 1116 may include all or a portion of destination object 1110. These views may contain different information regarding destination object 1110. For example, textual element 1106 may referent to an object class and views 1112, 1114, 1116 may contain different representations of the object class in Uniform Modeling Language (UML)

Figure 11C:
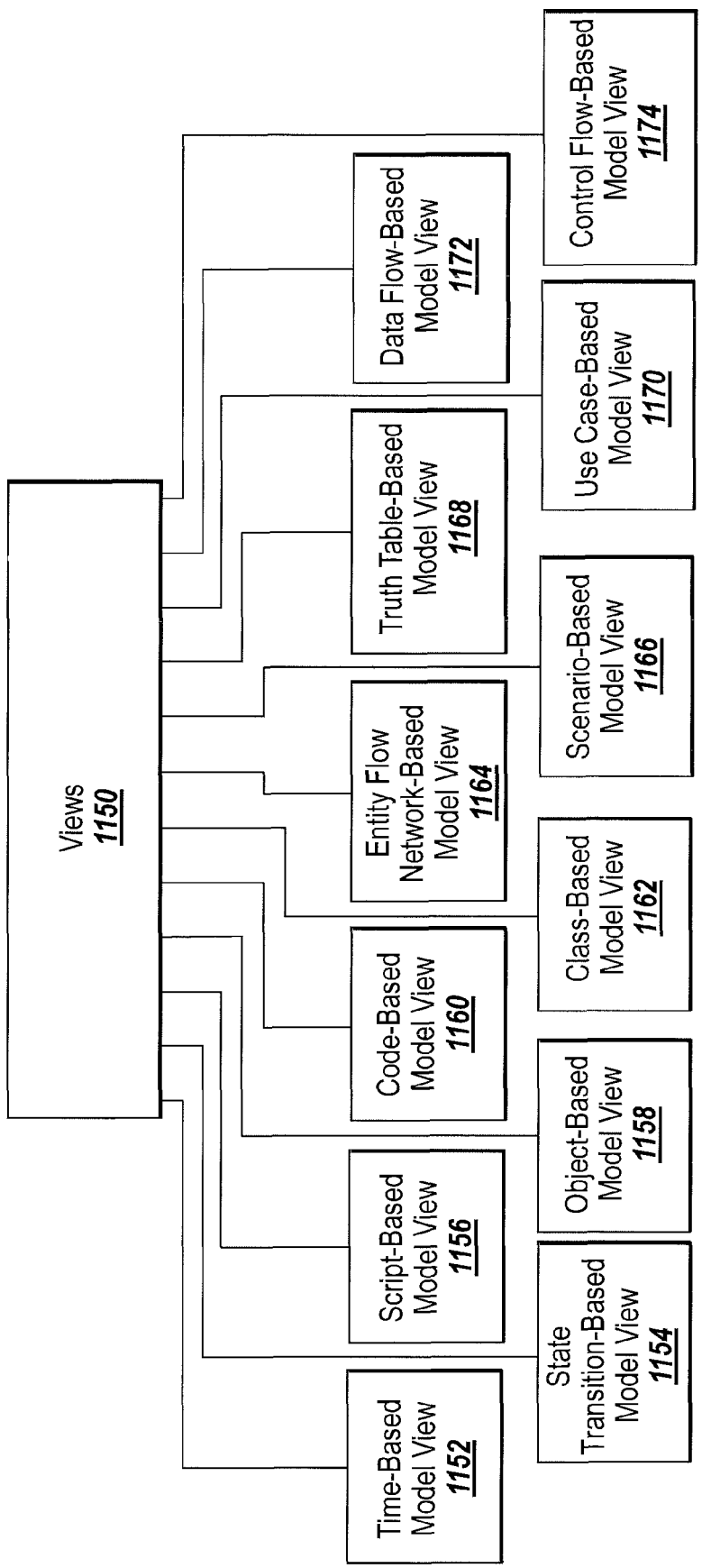
FIG. 11C illustrates a plurality of exemplary views of the model, according to various embodiments.

The types of views associated with model 1100 may vary and FIG. 11C illustrates exemplary views that may be associated with model 1100. This listing of types of views is intended to be illustrative and not limiting. The plurality of views 1150 may include a time-based model view 1152 that illustrates the time-dependent relationship between the components of model 1100; a state transition-based model view 1154 that illustrate the states associated with the components of model 1100 and transitions therebetween; a script-based model view 1156 that illustrates the script associated with model 1100; an object-based model view 1158 that illustrates the relationship and/or data exchange between objects of model 1100, object-based model view 1158 also illustrates the lifetime of an object that includes the creation and destruction of the object; a code-based model view 1160 that illustrates textual code associated with at least a portion of model 1100; a class-based model view 1162 that illustrates the relationship between the classes of model 1100 including but not limited to an inheritance relationship, a containment relationship, an association relationship; an entity flow network-based model view 1164 that illustrates model 1100 as a network of nodes, e.g. a Petri net, through which data flows; a scenario-based model view 1166 that illustrates a sequence diagram showing the sequence of events flowing between objects of model 1100; a truth-table-based model view 1168 that illustrates a truth-table associated with at least a component of model 1100; a use case-based model view 1170 illustrates the actors and the interactions of the actors associated with model 1100; a data flow-based model view 1172 illustrates the flow of data and/or signal between components of model 1100; and a control flow-based model view 1174 that illustrates a flowchart showing the flow of control in model 1100.

According to some embodiments, the user may interact with destination object 1110 to perform a debugging operation. The debugging operation may provide error and/or warning messages if there are discrepancies associated with destination object 1110. For example, the debugging operation may include setting a breakpoint. A breakpoint indicates a point at which the execution of destination object 1110 is halted. The debugging operation may support setting global and local breakpoints. Global breakpoints may halt execution on any occurrence of a specified type of breakpoint. Local breakpoints halt the execution on a specific object. When execution is halted at a breakpoint, execution results associated with the breakpoint can be examined. According to exemplary embodiments, the debugging operation may include displaying a value determined during execution of destination object 1110. Upon reviewing execution results, the debugging operation may continue execution of destination object 1110. Debugging operations may also include making single steps or compound steps through the execution of code associated with destination object 1110. For example, execution of code associated with destination object 1110 may be set to advance by the smallest possible step or by a preset step.

The user may also modify destination object 1110 through various methods. According to some embodiments, graphical affordances may be provided to the user for modifying destination object 1110. Exemplary graphical affordances is discussed below in connection with FIG. 12A. In some other embodiments, the user may modify destination object 1110 by modifying textual element 1106. An exemplary embodiment for modifying destination object 1110 by modifying textual element 1106 is discussed below in connection with FIGS. 12B-12C. In yet other exemplary embodiments, the user may directly modify destination object 1110 using interactive overlay 1108. Interactive overlay 1108 may be bi-directionally coupled to destination object 1110 such that a modification made on overlay 1108 is applied to destination object 1110 and a modification made to destination object 1110 is displayed on overlay 1108. Various mechanisms may be employed to realize such modifications. The discussion below relates to these mechanisms.

In an exemplary embodiment where the user modifies destination object 1110 using interactive overlay 1108, the user may modify the graphical appearance of destination object 1110. The user may change the shape, the color, the shade used in representing destination object 1110. For example, the user may change the shape of the graphical element representing destination object 1110 from a square to a circle. If, in the programming environment, the circle shape is associated with certain functionality, the user may have also changed the functionality of destination object 1110. The user may also change the location of a component of the destination object 1110 which may change the underlying semantics of the destination object 1110. For example, destination object 1110 may include a component that adds two input values and provides the output to a multiplication operation. By changing the location of the component, the user may change the input to the multiplication operation. In some embodiments, modifications to the graphical representation and underlying semantics of destination object 1110 may be performed as a part of a simulation of destination object 1110. The simulation of destination object 1110 may be displayed using animation techniques.

According to various embodiments, the user may modify destination object 1110 on overlay 1108 using an intermediate representation. The selected view 1102 may be parsed for creating the intermediate representation. An exemplary intermediate representation may take the form of an abstract syntax tree 870, like those illustrated in FIGS. 9A-9B. Thus, for example, textual element 1106 illustrated in FIG. 11A may have an associated abstract syntax tree that serves as an intermediate representation. Using the intermediate representation, a user may interact with destination object 1110 to change the functionality, the appearance and/or the attributes of the destination object 1110. For example, if destination object 1110 multiplies an input value with a constant, the user may change the value of the constant.

Figure 12A:
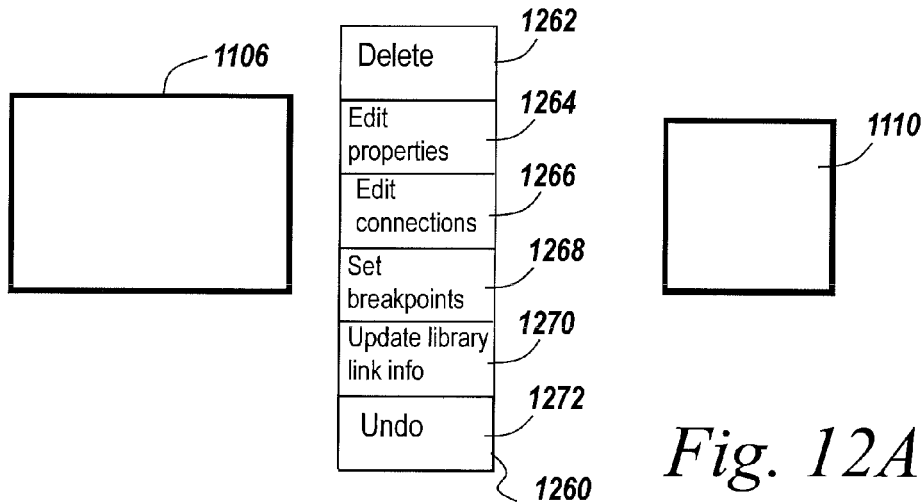
FIGS. 12A-12C illustrate a pull-down menu including a plurality of modification operations that can be performed on a destination object linked to a source object, according to various embodiments.

As indicated above, the user may modify destination object 1110 using graphical affordances. FIG. 12A illustrates a modification affordance 1260 that can be used for practicing exemplary embodiments. Modification affordance 1260 may be displayed upon hovering over textual element 1106. Modification affordance 1260 may also be displayed by being selected from a menu associated with the programming environment. Exemplary modification affordances may include a drop-down list, a menu, etc. By way of example, a user may modify destination object 1110, where the modification causes destination object 1110 to be configured to perform a modified operation.

Destination object 1110 may be executed and may perform a modified operation during execution. Modification affordance 1260 may include modifications such as deleting 1262 destination object 1110, editing properties 1264 of destination object 1110, editing connections 1266 to destination object 1110, setting breakpoints 1268 related with destination object 1110, updating library link information 1270 of destination object 1110 and undo 1272 modifications to destination object 1110. Deleting 1262 the destination object 1110 may remove destination object 1110 from the graphical model. Editing properties 1264 of destination object 1110 may modify and/or change values of the one or more properties associated with destination object 1110. Editing properties 1264 is further discussed in connection with FIGS. 12B-12C below. Editing connections 1266 to destination object 1110 may add or remove connections between components of the graphical model and destination object 1110.

Setting breakpoints 1268 may define breakpoints in the execution of code associated with destination object 1110. In some embodiments, destination object 1110 may be linked to a library object, i.e. an object in a collection of objects that serve as prototypes for inserting objects into the graphical model. Updating the library link information 1270 for the destination object 1110 may add or remove a link between destination object 1110 and one or more library objects.

Figure 12B:
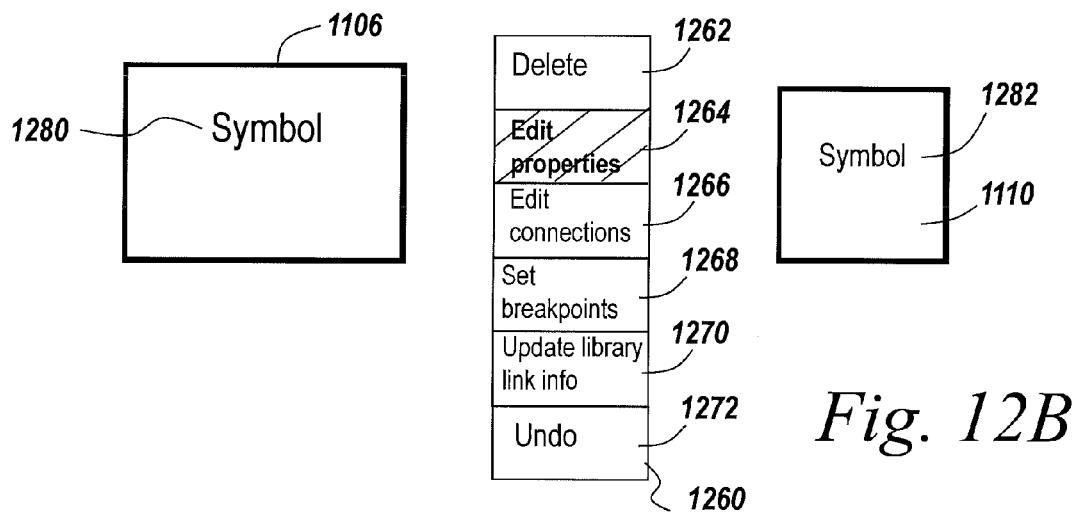

Referring now to FIG. 12B, the user may modify destination object 1110 by modifying textual element 1106. The user may modify textual element 1106 in selected view 1102, and the modifications may be automatically applied to destination object 1110 through the active link. The active link may memorize that textual element 1106 is associated with destination object 1110. When a modification originates from selected view 1102, the system knows to update destination object 1110. Similarly, when the modification originates from a view of destination object 1110, the system may be configured to update textual element 1106.

Textual element 1106 and destination object 1110 may have one or more properties. The properties of destination object 1110 may correspond to the properties of textual element 1106. An exemplary affordance may be provided for editing properties 1264 of destination object 1110 through editing properties of textual element 1106. In some embodiments, the properties of textual element 1106 may include a label, such as the label "symbol" 1280. Destination object 1110 may include a corresponding label, the label "symbol" 1282. The user may wish to modify label "symbol" 1282 of destination object 1110 to recite "symbol2". Since destination object 1110 is linked to textual element 1106, modifying label "symbol" 1280 of textual element 1106 may also modify label "symbol" 1282 of destination object 1110.

Figure 12C:

FIG. 12C illustrates the modification of label 1280 of textual element 1106 and the corresponding modification to label 1282 of destination object 1110. When the user modifies label "symbol" 1280 of textual element 1106 to recite, for example, "symbol2", label 1282 of destination object 1110 is automatically modified to recite "symbol2".

According to some embodiments, the modifications to the destination object 1110 may represent a first mode of operation for the destination object 1110. The destination object 1110 may have a second mode of operation, different than the first mode of operation, that monitors the modified destination object when the graphical model executes.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored in one or more tangible computer-readable storage media and may include computer-executable instructions that may be executed by processing logic. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A non-transitory computer-readable medium storing instructions, the instructions comprising:
one or more instructions that, when executed by a processor, cause the processor to:
receive a graphical model,
the graphical model including a plurality of views,
the plurality of views including a selected view,
the graphical model including a destination object,
the destination object performing an operation when the graphical model is executed, and
the graphical model being rendered on a display device based on the selected view;
parse at least a portion of the selected view to create an intermediate representation,
the intermediate representation including information regarding the destination object;
provide an interactive overlay for display on the display device;
receive an input instruction via the interactive overlay,
the input instruction being based on a use of the intermediate representation to interact with the destination object to modify the operation; and
modify the destination object based on the input instruction; and
execute the graphical model based on the modified destination object,
executing the graphical model including performing the modified operation.

2. The non-transitory computer-readable medium of claim 1, where the interactive overlay is displayed proximate to the selected view.

3. The non-transitory computer-readable medium of claim 1, where the interactive overlay is bi-directionally coupled to the destination object.

4. The non-transitory computer-readable medium of claim 1, where at least part of the selected view is automatically generated from another view of the plurality of views.

5. The non-transitory computer-readable medium of claim 1, where the instructions further comprise:
one or more instructions that, when executed by the processor, cause the processor to:
close the interactive overlay when the destination object is modified.

6. The non-transitory computer-readable medium of claim 1, where the graphical model is hierarchical.

7. The non-transitory computer-readable medium of claim 1, where the destination object is associated with executable code of the graphical model.

8. The non-transitory computer-readable medium of claim 1, where the destination object performs the modified operation when executable code associated with the destination object is executed.

9. The non-transitory computer-readable medium of claim 1,
where modifying the destination object represents a first mode of operation, and
where the first mode of operation is one of a plurality of modes of operation.

10. The non-transitory computer-readable medium of claim 9, where a second mode of operation, of the plurality of modes of operation, allows monitoring of the modified destination object when the graphical model executes.

11. A method comprising:
providing, for display, a graphical model,
receiving the graphical model being performed by a computing device,
the graphical model including a plurality of model views,
the plurality of model views including a selected view,
the graphical model including a destination object,
the destination object performing an operation when the graphical model is executed, and
the graphical model being rendered on a display device based on the selected view;
providing an interactive overlay for display on the display device, where:
providing the interactive overlay being performed by the computing device,
the interactive overlay being displayed in the selected view;
receiving, via the interactive overlay, information regarding use of an intermediate representation associated with the destination object to modify the operation,
receiving the information regarding the use of the intermediate representation being performed by the computing device; and
modifying the destination object based on the information regarding the use of the intermediate representation associated with the destination object,
modifying the destination object being performed by the computing device.

12. The method of claim 11, further comprising:
monitoring the modified operation,
monitoring the modified operation representing a first mode of operation of a plurality of modes of operation.

13. The method of claim 12,
where modifying the destination object comprises:
modifying the destination object when the graphical model is not executing, and
where modifying the destination object produces a modified destination object that performs a modified operation when the graphical model executes.

14. The method of claim 13, where modifying the destination object represents a second mode of operation of the plurality of modes of operation.

15. The method of claim 11, where providing the graphical model comprises:
providing the graphical model while performing a debug operation.

16. The method of claim 15, where the debug operation comprises one of setting a breakpoint, making a single step, making a compound step, continuing execution, or displaying a value.

17. The method of claim 11, further comprising:
interacting with the destination object based on an input instruction.

18. The method of claim 17, where interacting with the destination object comprises:
setting a breakpoint for the destination object.

19. A system comprising:
a processor to:
provide, for display, a graphical model,
the graphical model including a plurality of views,
the plurality of views including a first view and a second view,
the graphical model including a first element in the first view,
the graphical model including a second element in the second view,
the first element in the first view being related to the second element in the second view, and
the second element performing an operation when the graphical model is executed;
provide, for display, an overlay,
the overlay including an intermediate representation associated with the second element;
receive, via the overlay, information regarding a modification to the second element that is based on an interaction with the intermediate representation to modify the operation; and
modify the second element based on the information regarding the modification to the second element.

20. The system of claim 19, where, when modifying the second element, the processor is to:
perform one of:
editing properties of the second element,
editing connections to the second element, or
setting breakpoints related to the second element.

21. The system of claim 19, where the processor is further to:
perform an undo operation based on an instruction from a user after modifying the second element.

22. The system of claim 19, where the first view and the second view are hierarchical views.

23. The system of claim 19, where the first view is one of a time-based model view, a state transition-based model view, a script-based model view, a code-based model view, an entity flow network-based model view, a truth-table-based model view, a data flow-based model view, a control flow-based model view, an object-based model view, a class-based model view, a scenario-based model view, or a use case-based model view.

24. The system of claim 23, where the second view is different from the first view.

25. The system of claim 19, where the processor is further to:
perform a simulation animation by executing the modified second element.

26. The system of claim 19, where the processor is further to:
cause an execution the graphical model after modifying the second element,
the execution of the graphical model including the destination object performing the modified operation.

27. The system of claim 19, where the modified operation includes outputting a signal, outputting a value, or generating a plot.

* * * * *